United States Patent
Karabacak et al.

(10) Patent No.: US 11,454,352 B2
(45) Date of Patent: Sep. 27, 2022

(54) SENSOR ARRANGEMENT, UNDERWATER VEHICLE AND METHOD FOR UNDERWATER DETECTION OF A LEAK IN FLUID CARRYING BODY

(71) Applicant: Fugro Technology B.V., Leidschendam (NL)

(72) Inventors: Devrez Mehmet Karabacak, Amsterdam (NL); Anthony Charles Farn, Abu Dhabi (AE); Darren Paul Walley, Aberdeen (GB); Erik Paardekam, Delft (NL)

(73) Assignee: FUGRO TECHNOLOGY B.V., Leidschendam (NL)

( * ) Notice: Subject to any disclaimer, the term of this patent is extended or adjusted under 35 U.S.C. 154(b) by 517 days.

(21) Appl. No.: 16/498,320

(22) PCT Filed: Mar. 29, 2018

(86) PCT No.: PCT/NL2018/050196
§ 371 (c)(1),
(2) Date: Sep. 26, 2019

(87) PCT Pub. No.: WO2018/186738
PCT Pub. Date: Oct. 11, 2018

(65) Prior Publication Data
US 2020/0103079 A1    Apr. 2, 2020

(30) Foreign Application Priority Data

Apr. 3, 2017 (NL) .................................... 2018637

(51) Int. Cl.
*F17D 5/02* (2006.01)
*G01M 3/04* (2006.01)
*G01M 3/38* (2006.01)

(52) U.S. Cl.
CPC ................. *F17D 5/02* (2013.01); *G01M 3/04* (2013.01); *G01M 3/38* (2013.01)

(58) Field of Classification Search
CPC ........ F17D 5/00; F17D 5/02; G01M 3/00–08; G01M 3/38
See application file for complete search history.

(56) References Cited

U.S. PATENT DOCUMENTS 3,992,924 A    11/1976 Ells et al.
2010/0142326 A1    6/2010 Guigne et al.
(Continued)

FOREIGN PATENT DOCUMENTS

CA    2924876 A1 *    3/2014    ............. B63C 11/48
CN    203115505 U    8/2013
(Continued)

OTHER PUBLICATIONS

Eisler, Benjamin et al., "Fiber Optic Leak Detection Systems for Subsea Pipelines", OTC 23070; Offshore Technology Conference; Houston, TX; Apr. 3-May 2012.
(Continued)

*Primary Examiner* — Nguyen Q. Ha
(74) *Attorney, Agent, or Firm* — Polsinelli PC

(57) ABSTRACT

The document relates to a sensor arrangement for underwater detection of a leak in fluid carrying body, comprising a sensor support structure mountable to a carrier for enabling the sensor support structure to be suitably positioned or moved. A plurality of thermal sensors is distributed on the sensor support structure forming a sensor array. The sensors are provided by optical fibers connectable to an interrogator via optical signal connectors. Each fiber comprises intrinsic fiber optic sensors at respective locations within the fiber, forming the thermal sensors. The fibers are arranged on the support structure such that the intrinsic fiber optic sensors is (Continued)

distributed across the support structure to span a detection area. The document further relates to a method of performing leak detection as well as for discovering natural occurring leaks (sources).

16 Claims, 8 Drawing Sheets

(56) References Cited

U.S. PATENT DOCUMENTS

| | | | |
|---|---|---|---|
| 2014/0067268 A1* | 3/2014 | Tunheim | G01M 3/22 |
| | | | 702/2 |
| 2014/0283585 A1 | 9/2014 | Saether | |
| 2016/0231284 A1 | 8/2016 | Shiina et al. | |

FOREIGN PATENT DOCUMENTS

| | | | | |
|---|---|---|---|---|
| FR | 2971055 A1 * | 8/2012 | | G01K 17/00 |
| GB | 2382140 A | 5/2003 | | |
| JP | H0618247 A | 1/1994 | | |
| WO | 2004017037 A2 | 2/2004 | | |
| WO | 2007020392 A1 | 2/2007 | | |
| WO | 2014025464 A1 | 2/2014 | | |
| WO | WO-2014035749 A1 * | 3/2014 | | G01M 3/22 |
| WO | WO-2014058337 A1 * | 4/2014 | | F17D 5/00 |
| WO | WO-2014098068 A1 * | 6/2014 | | B25J 9/1679 |
| WO | 2018186738 A1 | 10/2018 | | |

OTHER PUBLICATIONS

English translation of CN203115505; retrieved from www.espacenet.com on Feb. 5, 2015.
International Search Report and Written Opinion; PCT Application No. PCT/NL2018/050196; dated Jul. 6, 2018.
English abstract of JPH0618247; retrieved from www.espacenet.com on Sep. 26, 2019.

* cited by examiner

SENSOR ARRANGEMENT, UNDERWATER VEHICLE AND METHOD FOR UNDERWATER DETECTION OF A LEAK IN FLUID CARRYING BODY

CROSS-REFERENCE TO RELATED APPLICATIONS

This application is a national stage application of International Application No. PCT/NL2018/050196, which was filed on Mar. 29, 2018, which claims priority to Netherlands Application Number 2018637 filed on Apr. 3, 2017, of which is incorporated by reference in its entirety.

FIELD OF THE INVENTION

The present invention is directed at a sensor arrangement and a method for underwater detection of a leak in fluid carrying body.

Although a leak in a container or in an industrial installation may reveal itself by leaving a trace, leaks in fluid conveying pipelines are many times difficult dependent on the circumstances. For example, big leaks may easily be detected by measuring a decreased output from a pipeline where it arrives, and may also directly reveal themselves by a spill at the location of the leak. Small leaks, however, are much more difficult to find. The trace of leaked fluid may be minimal such that it is easily overlooked. Moreover, a small leak may not be characterized by a noticeable pressure drop or decrease of output on the receiving side at the end of a pipeline. In particular if the leak occurs However, obviously even small leaks provide a burden on the environment dependent on the nature of fluid leaked, which therefore can be of great concern to the public and to the owner of the pipeline.

Several detection techniques have been developed to detect leaks in pipelines, each with its own advantages and disadvantages. For example, underwater vehicles equipped with a camera may be used to detect leaks in pipelines. However, such camera's must be able to provide sufficient image contrast in order to detect even small leaks. This however differs greatly on the camera and on the background of the image. For example a spill of a dark fluid against a dark background is difficult to detect, and thereby easy to be overlooked. As a result, this method is not reliable enough.

Another available solution is the use of a fluorescent fluid that enhances the contrast sufficiently to allow detection with a camera. The major disadvantage of this, however, is that the pipeline needs to be emptied first in order to fill it with the fluorescent fluid. This is a slow, cumbersome and rather expensive solution, in particular where the pipeline section to be checked is very long (requiring large quantities of tracer fluid).

Yet, a further known method to detect leaks is based on acoustic detection of leaks. This requires sensitive microphones or hydrophones that record sound while moving over the pipeline. The recorded sound is analyzed for typical sounds that are indicative of a leak. Upon encountering a leak, this allows detection and signaling thereof. The method is, however, not well working and prone to many kinds of disturbances. As may be appreciated, underwater or at the sea bed, the abundancy of all kinds of sounds of different origin renders this type of detection difficult and prone to providing false positives.

Other methods include electrical methods, and even further solutions are based on sample collection and subsequent mass spectrometry. None of these are very effective or may be applied easily on a regular basis. Obviously, sample collection is cumbersome and only provides a rough indication of an approximate location of a leak, requiring further investigation.

One further solution known as distributed temperature sensing requires the installation of lengths of optical fiber alongside the pipeline in the axial direction thereof. This is typically installed upon building of the pipeline. The measurement principle of these systems is based on fiber back scattering of radiation. Detection of a leak requires tracing the back scattered signal back to the leak. A disadvantage of this solution is that it is very expensive, as it requires a significant amount of fiber to be installed along the length of the pipeline. Except for the added material costs, also the installation of it adds on to the costs and to the complexity of building. This solution is only feasible in a limited number of cases.

SUMMARY OF THE INVENTION

It is an object of the present invention to provide a solution to the abovementioned problems, and in particular a method, arrangement and system for underwater detection of a leak in fluid carrying body, such as a pipeline.

To this end, there is provided herewith in accordance with a first aspect of the invention, a sensor arrangement for underwater detection of a leak in fluid carrying body, the sensor arrangement comprising a sensor support structure which is mountable to a carrier for enabling the sensor support structure to be suitably positioned or moved relative to the fluid carrying body, wherein a plurality of thermal sensors is distributed on the sensor support structure forming a sensor array, wherein the sensors are provided by one or more optical fibers connectable to an interrogator via one or more optical signal connectors, wherein each fiber comprises a plurality of intrinsic fiber optic sensors at respective locations within the fiber, the intrinsic fiber optic sensors forming the thermal sensors, wherein the one or more fibers are arranged on the support structure such that the plurality of intrinsic fiber optic sensors is distributed across the support structure such as to span a detection area.

A sensor arrangement in accordance with the present invention is based on the principle that a difference in temperature of the intrinsic fiber optic sensor is measurable by monitoring an output signal from the one or more intrinsic fiber optic sensors. For example, where the intrinsic fiber optic sensor is a fiber Bragg grating, an increase in temperature causes a change in the optical characteristics as well as the periodicity of the periodic variation in the refractive index of the fiber core, i.e. the effective refractive index changes and the grating is stretched due to thermal expansion. This results in an increase of the reflected wavelength, which is detectable by the interrogator.

As a result, the sensor arrangement spans a detection area wherein temperature changes are easily detectable. In many cases, in an underwater fluid carrying body such as a pipeline or a reservoir (natural or man-made), the fluids have a different temperature than the ambient temperature of the water. For example, in oil conveying pipelines, the oil that is pumped from the subsea reservoir is naturally hot due to the geothermal conditions of the reservoir or in some situations is heated such as to decrease its viscosity and thereby to increase its achievable fluid velocity. This allows more oil to be conveyed in a same amount of time. Oil leaking from the pipeline into the water therefore has an increased temperature compared to the ambient water (note further that water at the bottom of the sea is relatively cold (typically 4 degrees Celsius)). In particular with oil (and other fluids that do not mix with water, e.g. liquids or gasses), the phases do not mix. Therefore, while rising towards the surface, the oil bubble remains to be a closed pocket of warm liquid in the cold ambient water, and heat exchange only takes place via the bubble surface. If this bubble hits an intrinsic fiber optic sensor of the arrangement of the present invention, this is immediately detected as a sharp increase and subsequent sharp decrease (i.e. a spike, pulse, or delta peak signal) in the temperature monitored by analysis of the output signal.

For fluids that do mix with water, the temperature difference is also detectable, but typically not as a pulse, spike or delta peak signal. Due to mixing, in those cases, the temperature profile will spread out dependent on the travel distance from the leak to the sensor arrangement. In still water, a typical Gaussian temperature profile may be seen. In water governed by flow, the temperature profile becomes largely dependent on the local flow types, flow directions and flow velocities, and is therefore unpredictable. However, dependent on the fluid temperature in the pipeline, these increased temperatures are easily detectable, typically even at meters distance from the leak for a fluid having a significant different temperature compared to the ambient. For example, even with fluids that mix with water, assuming an original fluid temperature difference of 30 degrees of the temperature in the pipeline compared to ambient, an elevated temperature can easily be detected at 10 meters (even 20 meters) from the leak for a significant leak. The distance from the pipeline at which a bubble of oil—or another non-mixing fluid—remains detectable using a sensor arrangement in accordance with the present invention, is much larger due to the much lower amount of heat exchange and due to the fact that the pocket of oil remains compact (bubble).

Therefore, the sensor arrangement of the present invention is particularly suitable to detect leaks in fluid conveying bodies, such as pipelines, at a certain workable distance of even meters from the leak. The arrangement may be fabricated using parts of any desired material, e.g. materials that are low weight and strong and that are optimal for use underwater. This enables to install such a sensor arrangement easily on an underwater vehicle, or alternatively on a structure e.g. above a pipeline. Moreover, the use of intrinsic fiber optic sensors allows for fast and accurate detection. As explained, in particular non-mixing fluids such as oil or gasses, but even fluids that do mix with water, can be detected based on this principle. This allows the sensor arrangement of the invention to be useable in a wide field of applications for detecting leaks in pipelines or underwater storage facilities of the like.

Moreover, because of the potential to be of low weight, the sensor arrangement of the invention may even be used on a drone in the air to fly over pipelines and storage containers on and above the ground. In that case, the ambient medium is air instead of water, and typically the sensor arrangement then enables to detect leaking gasses or vapors of different temperature.

In some embodiments of a sensor arrangement of the invention, the output signals of the intrinsic fiber optic sensors are distinguishable from each other, such as to allow identification of each intrinsic fiber optic sensor associated with an output signal. This results in the interrogator being able to exactly determine which sensor has detected the temperature increase, which enables to localize the detector detecting the leak and thereby further enables to immediately localize the leak on the fluid carrying body. As may be appreciated, even if in accordance with some other embodiments, the output signals of different intrinsic fiber optic sensors are not distinguishable from each other—thereby not enabling to identify the sensor that detects the temperature increase—it is still possible to localize the leak on the fluid carrying body. In that case, it is at least certain that the temperature increase has been detected somewhere in the detection area. The location of the leak is thereby roughly known, enabling exact localization of the leak by inspecting the section of the fluid carrying body covered by the detection area.

According to some embodiments a spacing between two or more adjacent sensors of the plurality of intrinsic fiber optic sensors is within a range of 2 centimeter to 20 centimeter. Fluid bubbles having an increased temperature with respect to their environment, which directly and fully hit an intrinsic fiber optic sensor, cause for a clear, high and sharp pulse of increased temperature in the output signal. In cases wherein such a bubble grazes an intrinsic fiber optic sensor, a less intense (though sharp enough) pulse may be detected in the output signal. Where a bubble neither hits nor grazes, but completely misses the intrinsic fiber optic sensor, it may not be detected in the output signal. This is a bit different for fluids that mix well with the ambient water or ambient medium, which cause a more Gaussian temperature profile (dependent on the mixing conditions, e.g. turbulent or laminar and with or without additional flow components) detectable in a larger area but less intense. Therefore, a higher density of intrinsic fiber optic sensors increases the probability of detecting temperature variations indicative of leaks, which is particularly (though not exclusively) beneficial for detecting leaks of non-mixing fluids causing bubbles in the ambient medium (water).

According to some embodiments the plurality of intrinsic fiber optic sensors are arranged on the support structure such as to define a grid, wherein the intrinsic fiber optic sensors are regularly spaced. In these embodiments, the regular spacing of intrinsic fiber optic sensors in the grid provides for an equal probability of detecting a warm bubble of fluid or a local increase in temperature everywhere in the grid. The regular spacing could also be different in orthogonal directions, e.g. 2 centimeter in an x-direction and 3 centimeter in an y-direction within a plane of the detection area, without departing from the invention.

Alternatively or additionally, a spacing between two or more adjacent sensors of the plurality of intrinsic fiber optic sensors arranged on the support structure changes across the detection area. This is advantageous because the probability of detecting a leak and thereby the accuracy of the sensor arrangement may not have to be equal everywhere in the detection area. In a configuration wherein the sensor arrangement more or less bends around the body to be monitored, e.g. having a top surface and two or more side faces, or a cylinder or saddle shaped configuration, the density of sensors immediately above the body to be monitors may be higher than towards the sides of the detection area. Thus in such cases, according to particular of these embodiments, a spacing between two or more adjacent sensors of the plurality of intrinsic fiber optic sensors is larger towards one or more sides of the detection area than in a middle section of the detection area. Yet in accordance with further exemplary embodiments a spacing between two or more adjacent sensors of the plurality of intrinsic fiber optic sensors arranged on the support structure changes across the detection area in accordance with a location dependent function which is dependent on a location of the respective sensors in the detection area. In principle, any desired density profile of intrinsic fiber optic sensors across the detection area may be applied. Particular density distributions of sensors may have particular advantages dependent on the applications for which the sensor arrangement of the present invention is to be used.

In accordance with some embodiments, the support structure is shaped such as to provide, on at least one surface of the support structure, a detection area to be spanned by the plurality of intrinsic fiber optic sensors, the detection area comprising one or more planes or a curved surface. The detection area may simply be a plane comprising a grid of sensors. However, as stated above, the detection area may also be formed by the sensor arrangement more or less bending around the body to be monitored, e.g. having a top surface and two or more side faces, or a cylinder or saddle shaped configuration. In some embodiments, the surface of the support structure providing the detection area is shaped such as to enclose or curve around a detection space, or such as to face a detection point or line. Moreover, in some embodiments, the surface of the support structure comprises a main detection plane and one or more side detection planes, wherein the side detection planes are angled with respect to the main detection plane such as to face a pipe or tube to be scanned for leakage. In a preferred embodiment, the angles between the detection planes are variable to allow for adjustment of the detection planes to obtain as close as possible coverage to varying diameters of pipeline. The relative positioning of the panels can be controlled by the vehicle operator or can be pre-programmed.

In accordance with some embodiments of the invention, the intrinsic fiber optic sensors include at least one element of a group comprising: one or more fiber Bragg gratings; one or more ring resonators; one or more fiber lasers; and one or more multicore fiber sensors. Intrinsic fiber optic sensors of the types referred to above enable accurate detection of temperature changes. In particular, the use of fiber Bragg gratings as intrinsic fiber optic sensors is a preferred embodiment.

In accordance with a second aspect of the invention, there is provided an underwater vehicle for the detection of a leak in fluid carrying body, the vehicle having mounted thereon a sensor arrangement according to any of the embodiments of the first aspect described above, the underwater vehicle thereby forming a carrier to which a sensor support structure of the sensor arrangement is mounted for enabling the sensor support structure to be suitably positioned or moved relative to the fluid carrying body. The sensor arrangement mounted on an underwater vehicle can be operated such as to follow an underwater pipeline, for example, providing it's output signals or a detection signal for leak detection to a survey ship at the surface. The underwater vehicle could be of any known and suitable type to perform this task, e.g. an autonomous underwater vehicle, a remotely operated vehicle, a towed vehicle, or any other desired and suitable type of vehicle. The vehicle may be equipped solely with the sensor arrangement and some support systems and means to operate the arrangement or to communicate with other entities such as the survey ship. Moreover, the vehicle may be equipped with other tools or sensors to perform additional complementary or alternative tasks, e.g. for taking samples, performing small repairs, taking additional measurements, navigation, etcetera.

In some embodiments, the vehicle comprises an optical source and an optical receiver, wherein the optical source is configured to provide an optical signal to the one or more fibers of the sensor arrangement, and wherein the optical receiver is arranged for receiving an optical output signal from the one or more optical fibers, the underwater vehicle further comprising a controller device cooperating with the optical receiver for processing of the optical output signals. The controller may for example simply be suitable for translating output signals into temperature readings, convert these into electrical signals to be send via electrical cables to the surface, or to convert the output signals into data transmitted via a wireless or wireline connection. Alternatively or additionally, the controller may perform further analysis to interpret the readings, or to combine these with e.g. positional data from a positioning system.

In accordance with some embodiments, the vehicle comprises an interrogator, and wherein the optical receiver and the controller device are provided by the interrogator. Alternatively, the interrogator may be present on a survey ship and optical signals are transmitted via an optical fiber line connection to the vehicle. This may easily be done at even great depths on the bottom of the ocean, kilometers underneath the water surface.

In some embodiments, the vehicle further comprises at least one of a group comprising: a positioning system or positioning device, such as an ultra short base line transponder for use in an ultra short base line acoustic positioning system; an analyzer communicatively connected to the controller for receiving a controller output signal and performing analysis for leak detection; a memory unit for data storage; or a communication device for wireless or wireline communication for exchanging data and/or instructions with a remote system. The invention is not limited to these examples.

In accordance with some embodiments, the vehicle comprises an optical connector for providing at least one or both of an optical signal input and an optical signal output, the optical connector being configured for connecting the vehicle to an optical fiber line for conveying optical signals; the vehicle further comprising a controller, a clock configured for being synchronized with a remote clock via the optical fiber line, and an ultra short base line transponder for use in an ultra short base line acoustic positioning system, wherein the controller is arranged for associating a transponder signal provided by the transponder with a clock signal from the clock for enabling association of an optical sensor signal with a location remotely at a survey carrier. These embodiments allow positioning based on an ultra short base line system, i.e. an acoustic positioning system that enables relative positioning of the vehicle with respect to the survey ship. The survey ship may be equipped with a satellite based positioning system, such as a global positioning system, or with a different positioning system useable at sea.

In accordance with a third aspect, there is provided a method of performing underwater inspection for detection of a fluid in fluid carrying body, the method applying a sensor arrangement comprising a sensor support structure which is mountable to a carrier, wherein a plurality of thermal sensors is distributed on the sensor support structure forming a sensor array, the method comprising: moving or positioning the sensor support structure relative to the fluid carrying body; obtaining, during said moving or positioning, sensor signals from the thermal sensors; and detecting a difference in temperature as indicated by at least one of the sensor signals relative to at least one further sensor signal, for detecting a temperature difference in at least one locality relative to an ambient temperature; wherein the sensors are provided by one or more optical fibers, each fiber comprising a plurality of intrinsic fiber optic sensors at respective locations within the fiber, the intrinsic fiber optic sensors forming the thermal sensors, wherein the one or more fibers are arranged on the support structure such that the plurality of intrinsic fiber optic sensors is distributed across the support structure such as to span a detection area; and wherein for obtaining the sensor signals, the method comprises: providing, using an optical source, an optical input signal to the one or more fibers of the sensor arrangement, and receiving, using and optical receiver, one or more optical output signals from the one or more optical fibers, for detecting the temperature difference from the one or more optical output signals.

In some embodiments, the fluid carrying body is an underwater pipeline conveying oil, the oil having a temperature above an ambient temperature of the ambient water, and the step of detecting comprises detecting said temperature difference as a spike shaped or delta pulse shaped signal in the sensor signal of one thermal sensor or in the sensor signals of two or more adjacent thermal sensors, the delta pulse shaped or spike shaped signal being indicative of an oil bubble of said oil in the ambient water. As described above, this method applies to the detection of oil in water, but may equally be applied for detecting other media that do not mix with water—such as gasses.

In accordance with some embodiments, the plurality of intrinsic fiber optic sensors are arranged on the support structure such as to define a grid, such that the intrinsic fiber optic sensors are regularly spaced, the step of detecting comprising mapping of a local temperature profile from the sensor signals. In particular, the output signal from the different sensors should be identifiable to allow associating these with the respective sensors. For example, the sensors may operate at different wavelengths or combinations of wavelengths. Dependent on the type of sensors, they may be interrogated subsequently or they may be addressed individually. Various possibilities exist dependent on the exact implementation. Different wavelengths is for example possible where multiple fiber Bragg gratings are present in one fiber of a plurality of fibers part of the sensor arrangement.

In accordance with a fourth aspect, the sensor arrangement of the present invention may also be applied for detecting natural occurring leaks, typically referred to as seeps or seepage. A seep is a natural occurring leak of fluid from the sea bed, and may therefore be generally referred to as a natural source in the ground (note that natural sources on the land may likewise give rise to flows of fluid of different temperature with respect to the ambient air). Such natural occurring leaks of for example oil or natural gas may occur near reservoirs of natural resources such as hydrocarbons, and the detection thereof therefor may contribute to discovery and exploration of unknown oil and gas fields.

Therefore, in accordance with the fourth aspect there is provided a method of performing underwater inspection for detection of a fluid flow from a natural source in the ground, such as a seep in a sea bed, the method applying a sensor arrangement comprising a sensor support structure which is mountable to a carrier, wherein a plurality of thermal sensors is distributed on the sensor support structure forming a sensor array, the method comprising: moving or positioning the sensor support structure relative to the ground, obtaining, during said moving or positioning, sensor signals from the thermal sensors; and detecting a difference in temperature as indicated by at least one of the sensor signals relative to at least one further sensor signal, for detecting a temperature difference in at least one locality relative to an ambient temperature; wherein the sensors are provided by one or more optical fibers, each fiber comprising a plurality of intrinsic fiber optic sensors at respective locations within the fiber, the intrinsic fiber optic sensors forming the thermal sensors, wherein the one or more fibers are arranged on the support structure such that the plurality of intrinsic fiber optic sensors is distributed across the support structure such as to span a detection area; and wherein for obtaining the sensor signals, the method comprises: providing, using an optical source, an optical input signal to the one or more fibers of the sensor arrangement, and receiving, using and optical receiver, one or more optical output signals from the one or more optical fibers, for detecting the temperature difference from the one or more optical output signals.

Instead of following a fluid carrying body, such as a pipeline, the method in accordance with the fourth aspect may include moving the sensor arrangement relative to the ground in a certain search pattern, such as to explore a desired area on the ground, e.g. a part of the sea bed).

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
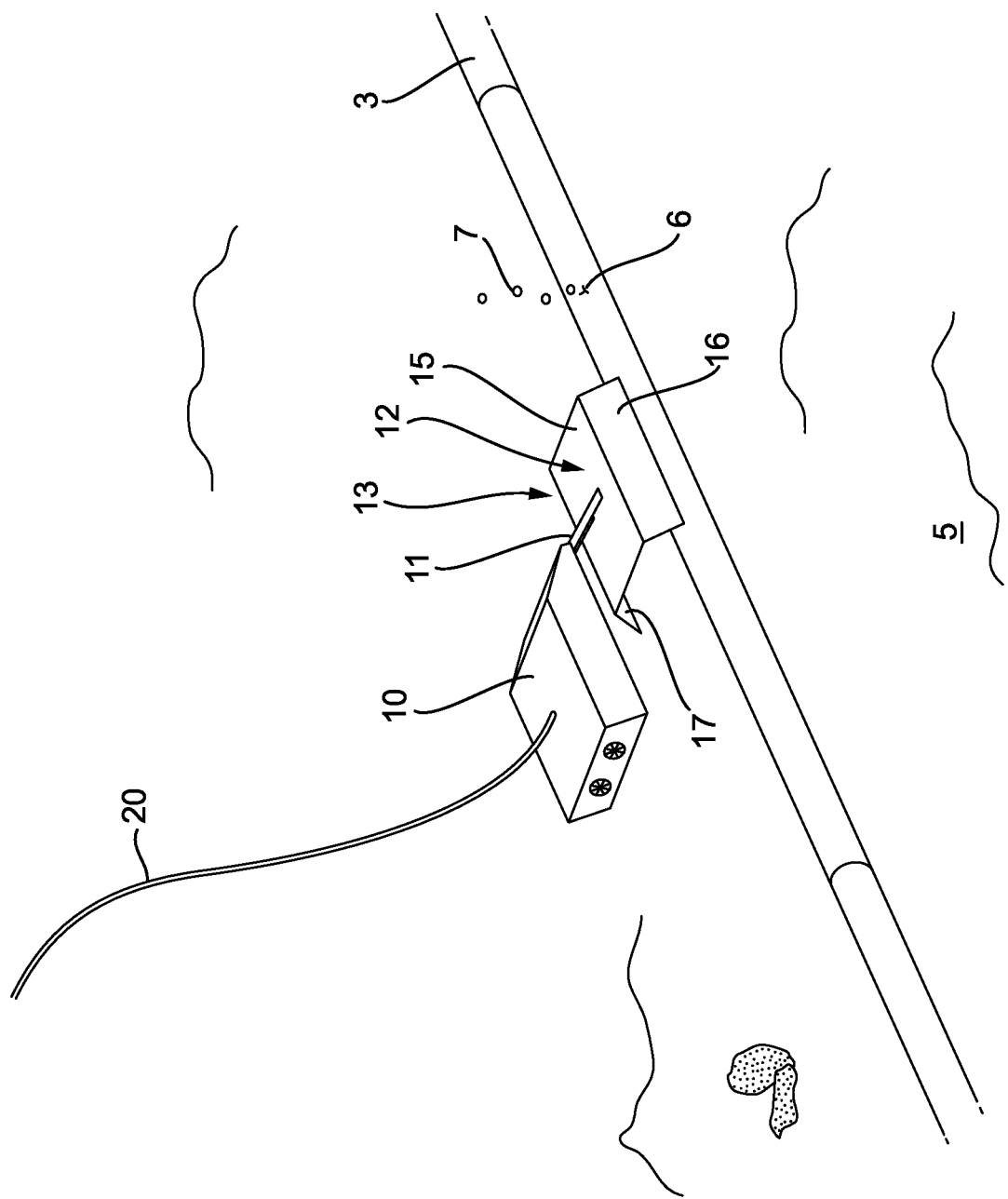
FIG. 1 schematically illustrates an underwater vehicle comprising a sensor arrangement in accordance with the present invention.

FIG. 1 schematically illustrates an underwater vehicle 10. The underwater vehicle 10 may be an autonomous underwater vehicle (AUV), remotely operated vehicle (ROV) or a different type of vehicle that may be controlled or operated from a survey ship 50 at the surface. In the example of FIG. 1, the remotely operated vehicle 10 is connected to a survey ship by means of a wireline connection 20 comprising a plurality of optical fibers. The optical fibers in wireline connection 20 allow for the exchange of optical signals with the remotely operated vehicle 10. Optionally, additional signal transfer lines, such as electrical connections, may be comprised by the wireline connection 20 dependent on the type of remotely operated vehicle 10 and/or the requirements of the on-board equipment.

A sensor arrangement 12 comprises a sensor support structure 13 and a mounting structure 11. The sensor arrangement 12 is mounted to the underwater vehicle 10 by means of the mounting structure 11. The sensor support structure 13 comprises a top face 15 and two side faces 16 and 17. The sensor support structure 13, on these faces 15, 16 and 17 comprises a grid of thermal sensors distributed across the surface of the faces 15, 16 and 17. The sensors are facing the pipeline 3. The pipeline 3 runs across the sea bed 5 between two different geographic locations. For example, the pipeline 3 may be transporting oil from a first location to a second location. The remotely operated vehicle 10 having mounted thereon the sensor arrangement 12, moves over the pipeline 3 accurately following the length of the pipeline for detecting any leaks therein. As an example, the pipeline 3 comprises a small leak 6 through which oil bubbles 7 escape, which are rising towards the surface of the sea. As may be appreciated, the sensor arrangement 12 is also suitable for detecting large oil spills, wherein large amounts of oil leak from the pipeline into the ambient water. However, in the present example a small leak 6 is depicted through which only bubbles 7 of oil are released is taken as example, because this type of oil spill is difficult to detect using different technologies.

Using an underwater vehicle 10 in accordance with the present invention, having mounted thereon a sensor arrangement 12 in accordance with the present invention, the vehicle is moved above the pipeline 3 relative thereto. The plurality of thermal sensors is located on those side of the faces 15, 16 and 17 that are facing the pipeline 3. Any bubble 7 that hits or grazes a thermal sensor, changes the output signal of the thermal sensor enabling detection of a sudden temperature increase. As explained hereinabove, for bubbles of warm oil in the ambient sea water, the temperature increase is detected as a sharp peak in case it directly hits the thermal sensor. A somewhat less intense sharp peak is detected in case the bubble grazes the sensor.

Figure 2:
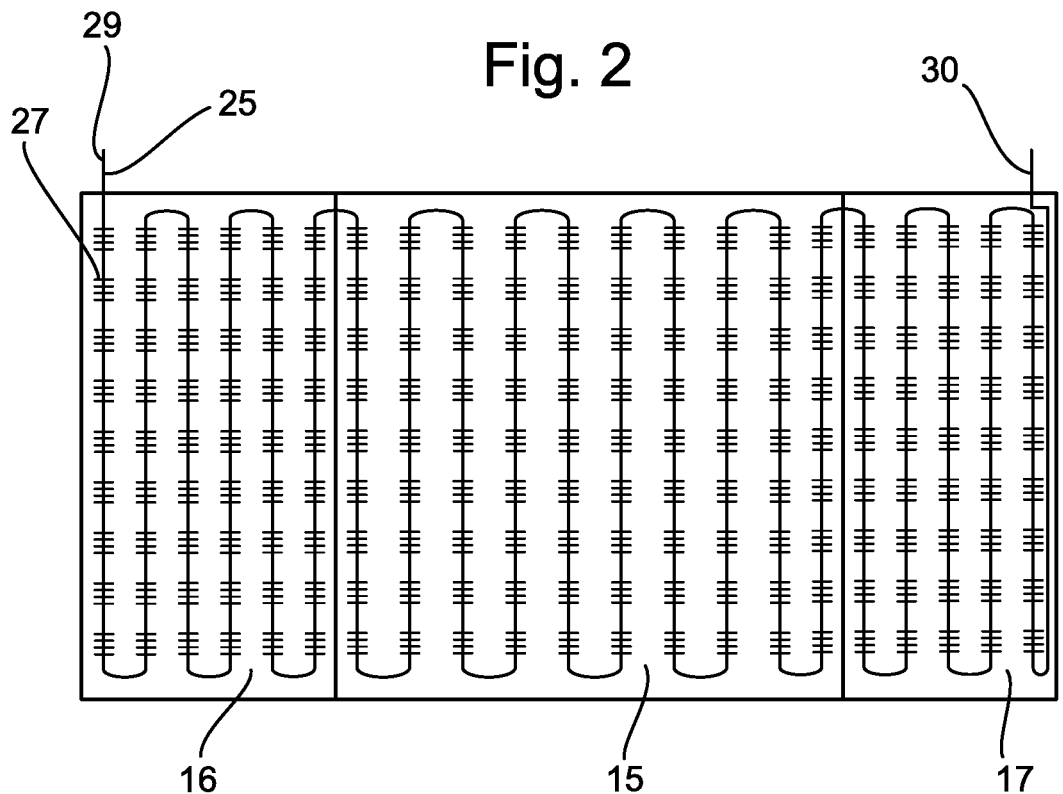
FIG. 2 schematically illustrates a sensor arrangement in accordance with the present invention.

The sensors used in the sensor arrangement 12 illustrated in FIG. 1 are intrinsic fiber optic sensors that are comprised by an optical fiber. This is schematically illustrated in FIG. 2. FIG. 2 schematically illustrates a sensor arrangement in accordance with the present invention. In FIG. 2, the top face 15 and side faces 16 and 17 are again indicated. In the embodiment of FIG. 2, a single fiber 25 comprises one input 29 and one output 30. An optical signal is fed to the input 29 of the optical fiber and may be detected as an output signal at the output 30.

The optical fiber 25 comprises a large amount of fiber Bragg gratings (FBG) 27. The fiber Bragg gratings 27 are distributed across the surface of the detection area formed by the faces 15, 16 and 17. The FBG's 27 are distributed across the detection area such as to form a grid of thermal sensors 27. A fiber Bragg grating, when being lit with an optical signal, is characterized by reflecting a single wavelength of the light back towards the source. Therefore, at the input 29 of the optical fiber 25 the reflected wavelength of each fiber Bragg grating 27 is received. Likewise, the reflected wavelength is (for the most part) absent in the output signal at the output 30. Therefore at the output 30, those parts of the optical input signal that are reflected by each of the fiber Bragg gratings 27 are visible as being absent in the spectrum of the received optical signal at each of the wavelength reflected. By using fiber Bragg gratings that each have a different characteristic reflected wavelength, it is possible to identify and localize the thermal sensor that has detected the leak by analyzing the reflected wavelength.

Figure 3:
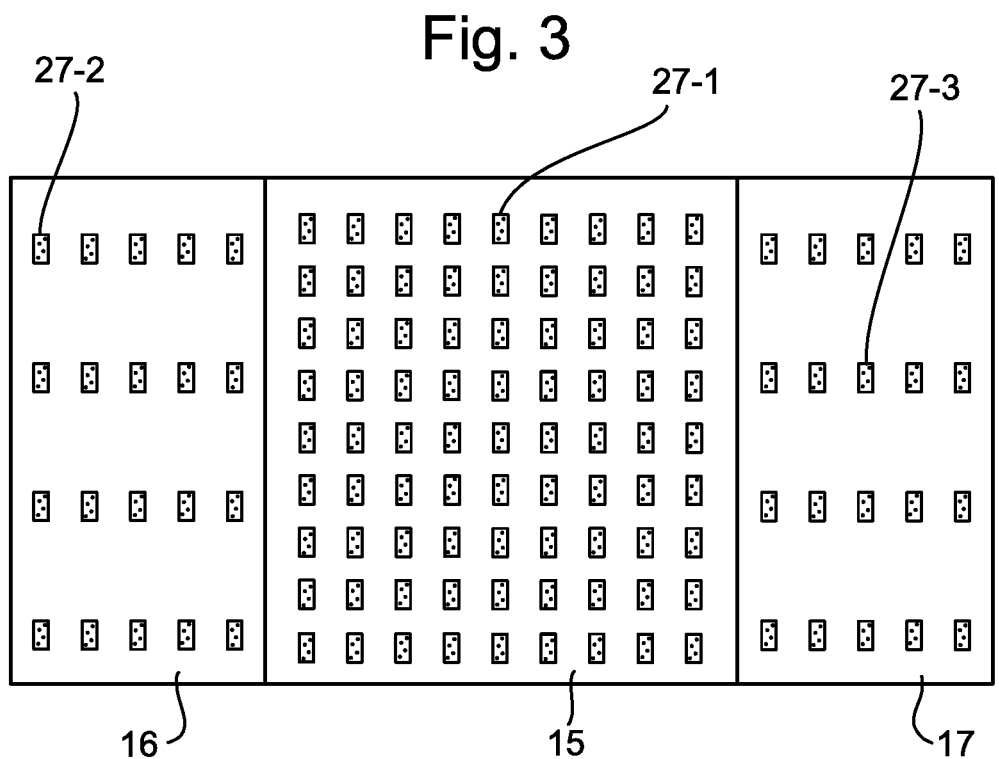
FIG. 3 schematically illustrates a sensor arrangement in accordance with the present invention.

In the embodiment of FIG. 2, the distribution of fiber Bragg gratings 27 across the detection area formed by faces 15, 16 and 17 is more or less uniform. However, in different embodiments, the density of thermal sensors 27 may differ across the detection area. One example is provided in FIG. 3. In FIG. 3, the top face 15 comprises a plurality of fiber Bragg gratings 27-1. Side face 16 comprises a plurality of fiber Bragg gratings 27-2 and side face 17 comprises a plurality of fiber Bragg gratings 27-3. As follows from FIG. 3, the density of fiber Bragg gratings 27-1 across the surface of top face 15 is much higher than the density of fiber Bragg gratings 27-2 and 27-3 in side faces 16 and 17 respectively.

As may be appreciated, oil leaking through pipeline 3 will find its way up to the surface of the sea. Therefore, most of the bubbles that are released from a leak 6 will be detected by hitting one of the thermal sensors in the top face 15. By increasing the density of fiber Bragg gratings 27-1 in top face 15, the probability of detecting a leak 6 in pipeline 3 is maximized. The function of the additional thermal sensors in side faces 16 and 17 is mainly to prevent that bubbles 7 that for some reason do not reach the top face 15 will remain undetected. Moreover, side faces 16 and 17 are slanted with respect to top face 15.

Therefore, a certain density of thermal sensors in the side faces 16 and 17 is desired, but the density of thermal sensors may be lower as in the embodiment of FIG. 3.

Figure 4:
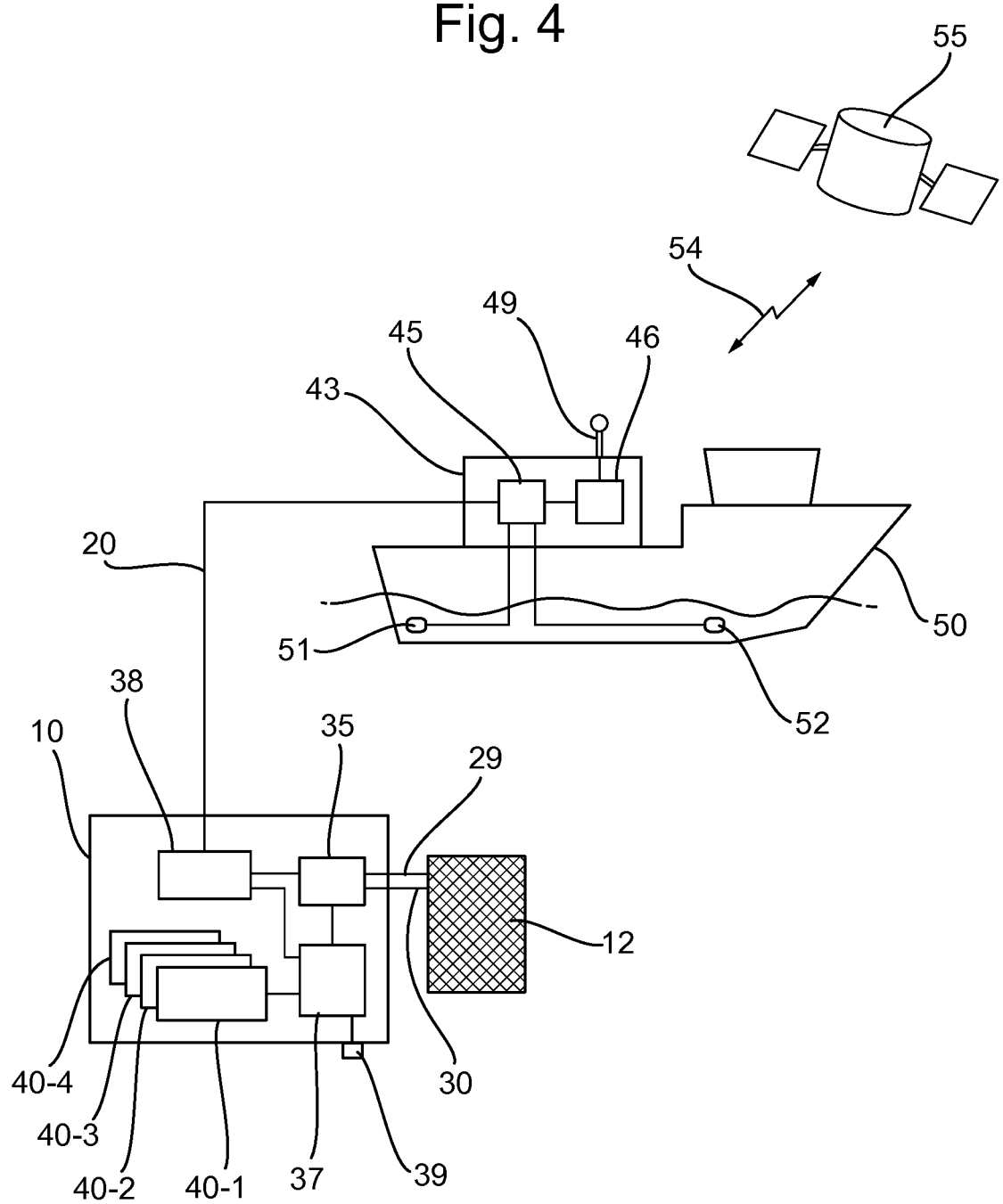
FIG. 4 schematically illustrates a system comprising an underwater vehicle and a sensor arrangement in accordance with the present invention.

FIG. 4 illustrates a system for the detection of a leak in an underwater pipeline 3 in accordance with the present invention. The system comprises a survey ship 50 from which a remotely operated vehicle 10 is operated via wireline 20 comprising optical fiber. The remotely operated vehicle 10 comprises a sensor arrangement 12 having an optical input 29 and optical output 30 as described above. The input 29 and output 30 are connected to an interrogator 35 on board the remotely operated vehicle.

Alternatively, element 35 may simply be replaced by an optical source and receiver, and even as a further alternative the optical signal may simply be send to the remotely operated vehicle 10 via one or more of the fibers of wireline 20. In the embodiment of FIG. 4, however, the interrogator 35 is installed on-board of the remotely operated vehicle 10.

Furthermore, a controller 37 receives the sampled output signal from the interrogator 35. The controller 37 and interrogator 35 are connected to a communication unit 38 that enables communication with the survey ship 50 via the wireline cable 20. Additional equipment 40-1, 40-2, 40-3 and 40-4 may be present on the remotely operated vehicle, and may be operated through the controller 37. For example, one of the entities 40-1 through 40-4 may be a data memory, or any of the other entities mentioned hereinbefore. Data from the controller 37, such as temperature data received from the interrogator 35, may precautionary be stored in the memory unit for later use, while simultaneously being sent to the surface via wireline cable 20. Also, such data may be linked to other data, or may be provided to different equipment units of the remotely operated vehicle 10. For example one other of the equipment units 40-1 to 40-4 may be a heat camera that enables to provide additional means for detecting the leak at the surface of pipeline 3 as soon as a leak is detected using the sensor arrangement 12. Additionally, upon detection of a potential leak with the fast response thermal sensors is identified, the survey vehicle can be slowed down or stopped for more detailed analysis using some of the slower response detection schemes such as chemical analysis with optical spectral absorption technique which can allow for more accurate characterization of the leak and its content. Coordination between the on-board elements of the remotely operated vehicle 10 may be provided via the controller 37. Data from the interrogator 35 is further provided via the wireline cable 20 to the survey vessel 50 wherein it is analyzed using analysis system 45 in unit 43.

Preferably, leak detection is automatically associated with positional information of the remotely operated vehicle 10. To this end, a remotely operated vehicle may comprise some kind of positioning system that may be applied underwater. In the example of FIG. 4, the remotely operated vehicle 10 comprises an exterior transponder 39 in connection with the controller 37. Moreover, on the survey vessel 50, a first transducer 51 and a second transducer 52 may be located on different parts underneath the hull of the vessel 50. The transducers 51 and 52 may be used for sending acoustic pulses to the transponder 39. Simultaneously, a synchronization signal is provided via the optical fibers of wireline 20 to the controller 37 of the remotely operated vehicle 10. By synchronizing the analysis system 45 with the controller 37 via a clock signal, the transmission and receipt times of the transducer signals may be accurately recorded, and the relative location of the remotely operated vehicle with respect to the survey vessel 50 may accurately be determined by triangulation of the signals received in this matter. Simultaneously, the survey vessel 50 is equipped with a global positioning system (GPS) 46 which receives via antenna 49 a GPS signal 54 from a plurality of satellites 55. By associating the GPS signal with the relative location of the remotely operated vehicle 10, the exact location of the remotely operated vehicle 10 is known at all times.

When using the sensor arrangement 12 of the present invention a sudden temperature increase is detected which indicates the presence of a potential leak in the pipeline 3, the location of the leak 6 can be directly associated with the current position of the remotely operated vehicle 10. In that matter, the exact location of the leak 6 in the underwater pipeline 3 can be recorded. Recording of this data may be performed both on the survey vessel and on the remotely operated vehicle 10. This provides the advantage that in case of any technical failure (e.g. damage to one of the fibers in cable 20) the data from the remotely operated vehicle is not lost, and the leak may simply be found by analysis of the data in the memory of the remotely operated vehicle.

FIG. 4 illustrates a more complex system with some additional functionality for detecting leaks in underwater pipelines. In principle, the remotely operated vehicle 10 may have a rather plain configuration and may only comprise a sensor arrangement 12 and means for controlling the position of the ROV 10. In that case, the optical signals may be provided via the wireline 20 and may not be stored on board of the ROV 10. The transponder 39 and transducers 51 and 52 may be present, and also a clock signal may be exchanged with an on-board controller 37 on the remotely operated vehicle 10. This allows exact positioning of the remotely operated vehicle 10. As may be appreciated, this position data is then to be forwarded via the wireline cable 20 to the survey vessel 50.

Figure 5:
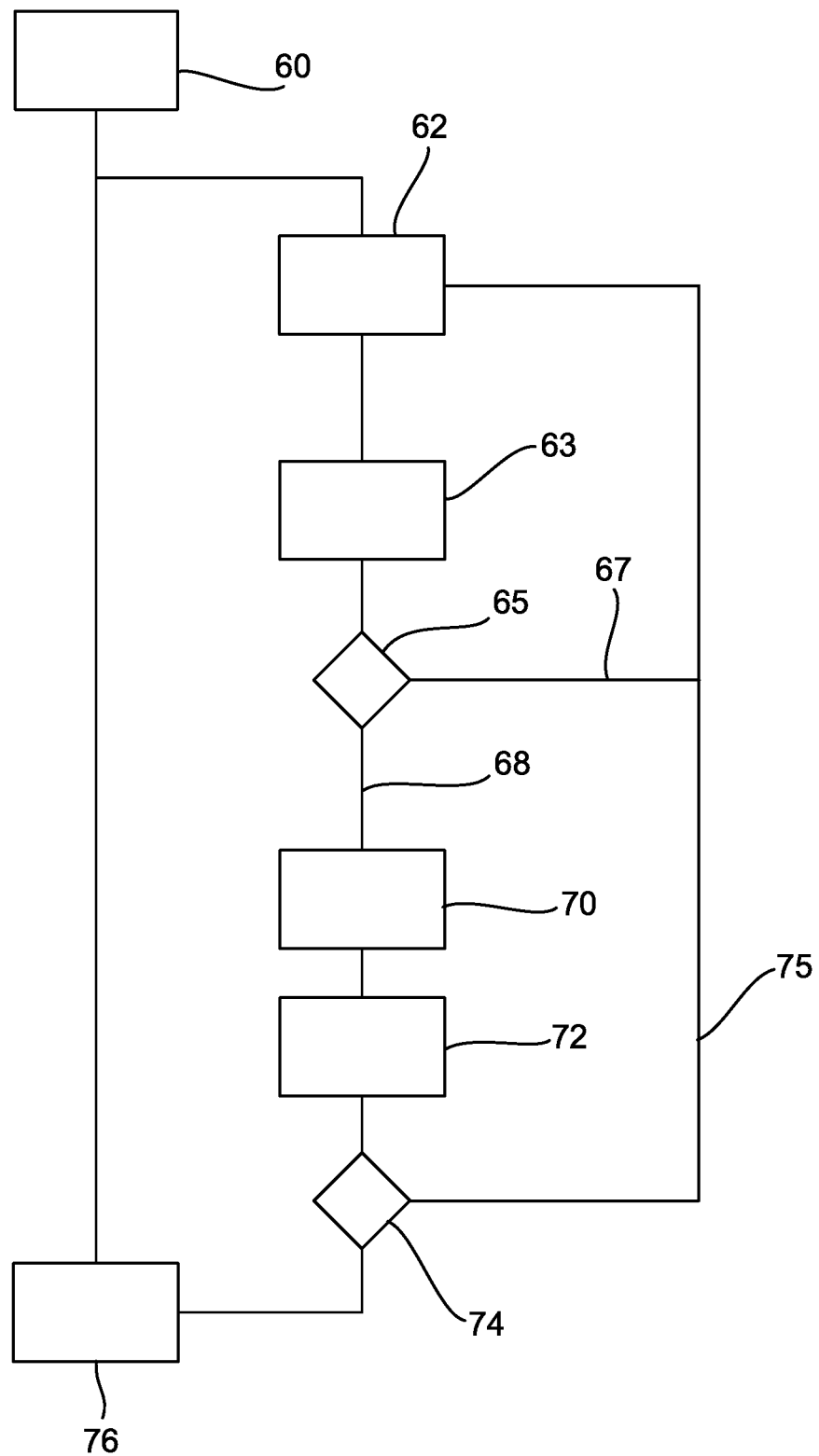
FIG. 5 schematically illustrates a method in accordance with the present invention.

FIG. 5 illustrates a method in accordance with the present invention. In FIG. 5, the sensor arrangement is moved in step 60 relative to the fluid carrying body (e.g. the pipeline 3). While being moved, in step 62 the sensor signal is obtained from the sensor arrangement 12. In step 63, this sensor signal is analyzed such as to identify any sudden temperature increases that indicate the presence of hot bubbles in the relatively cold ambient environment. In decision step 65, it is determined whether a potential leak is detected. In absence of any sudden temperature increases in the signal, the method goes back to step 62 for obtaining a next sensor output signal. As may be appreciated, the optical signal from the sensor arrangement 12 may be sampled before being analyzed in step 63. In case a sudden temperature increase is detected in the output signal of the sensors, the method follows path 68, and in step 70 the sudden temperature increase as well as the exact sensor identifier that has detected the increase may be associated with a positional signal available to the controller 37. Next, in step 72, this data is recorded in the memory of the remotely operated vehicle and/or sent to the survey vessel for processing and alert generation. In decision step 74, it is determined whether the leak detection method is to be continued. If the method is to be continued, path 75 is followed and a next sensor reading is obtained in step 62. Otherwise, the method will end in step 76.

In the abovementioned fourth aspect of the invention, the method applied is similar to the method illustrated in FIG. 5. However, in absence of a fluid carrying body, the method of this embodiment differs in that instead of following a fluid carrying body, in step 60 positioning or moving the sensor arrangement relative to the ground is performed. For example, the sensor arrangement may be moved relative to the sea bed in a certain search pattern to explore a part of the sea bed. The search pattern could be any of known useful search patterns (e.g. zig zag, square, circular) that may be applied for exploring that part of the sea bed.

Figure 6:
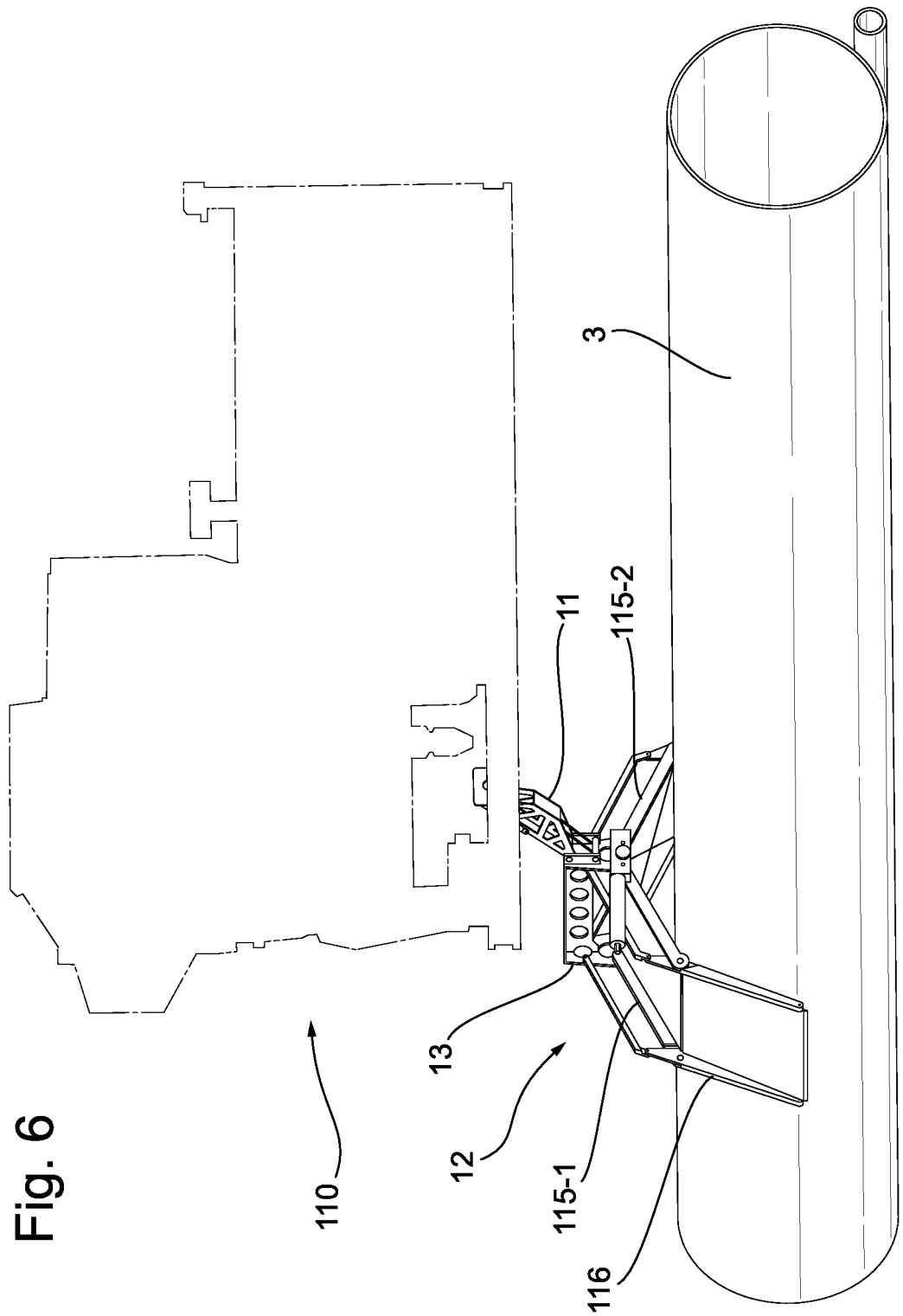
FIG. 6 is an illustration of a embodiment of the invention.
Figure 7:
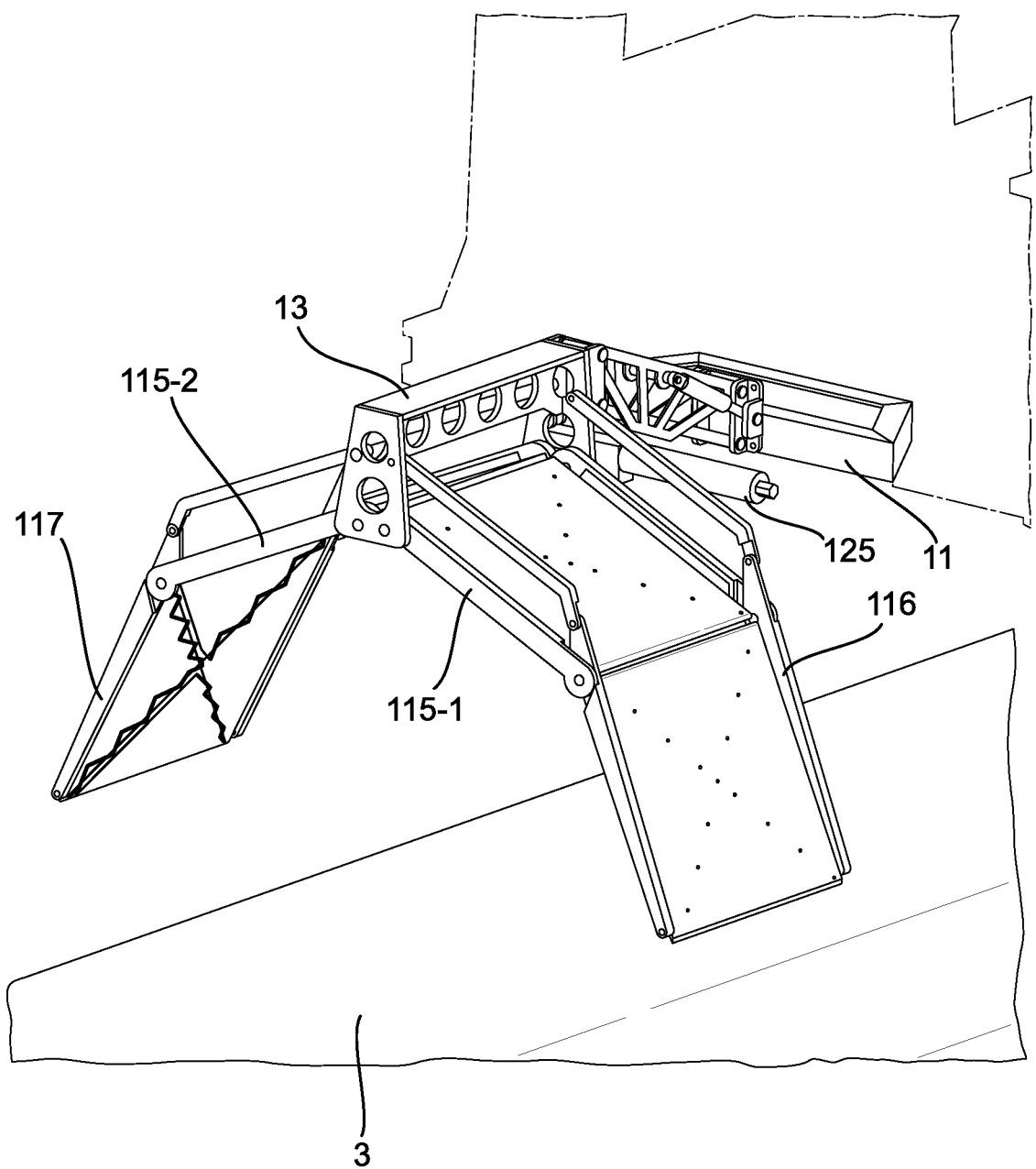
FIG. 7 is an illustration of the embodiment of FIG. 6.

FIGS. 6-9 are CAD drawings of a sensor arrangement design in accordance with an embodiment of the present invention. Some of the reference numerals, such as 3, 11, 12 and 13 refer to parts the are same or similar to the elements illustrated in FIG. 1. In particular, the sensor arrangement 12 is illustrated in FIG. 6 while inspecting a pipeline 3. The arrangement comprises a support structure 13 to which the panels 116, 115-1, 115-2 and 117 which form the faces (top faces 115-1 and 115-2, and side faces 116 and 117) of the arrangement, i.e. similar to faces 15, 16 and 17 in FIG. 1 which comprise the sensors 27. The sensor arrangement 12 further comprises a mounting structure 11. With the mounting structure 11, the sensor arrangement may be mounted to a carrier, such as an underwater vehicle, which is schematically illustrated in FIGS. 6-9 as a carrier construction 110. As illustrated in FIG. 7, the sensor arrangement further comprises a hydraulic or pneumatic actuator 125, which allows the panel structure comprising panels 115-1, 115-2, 116 and 117 to be opened and closed in operation.

Figure 8:
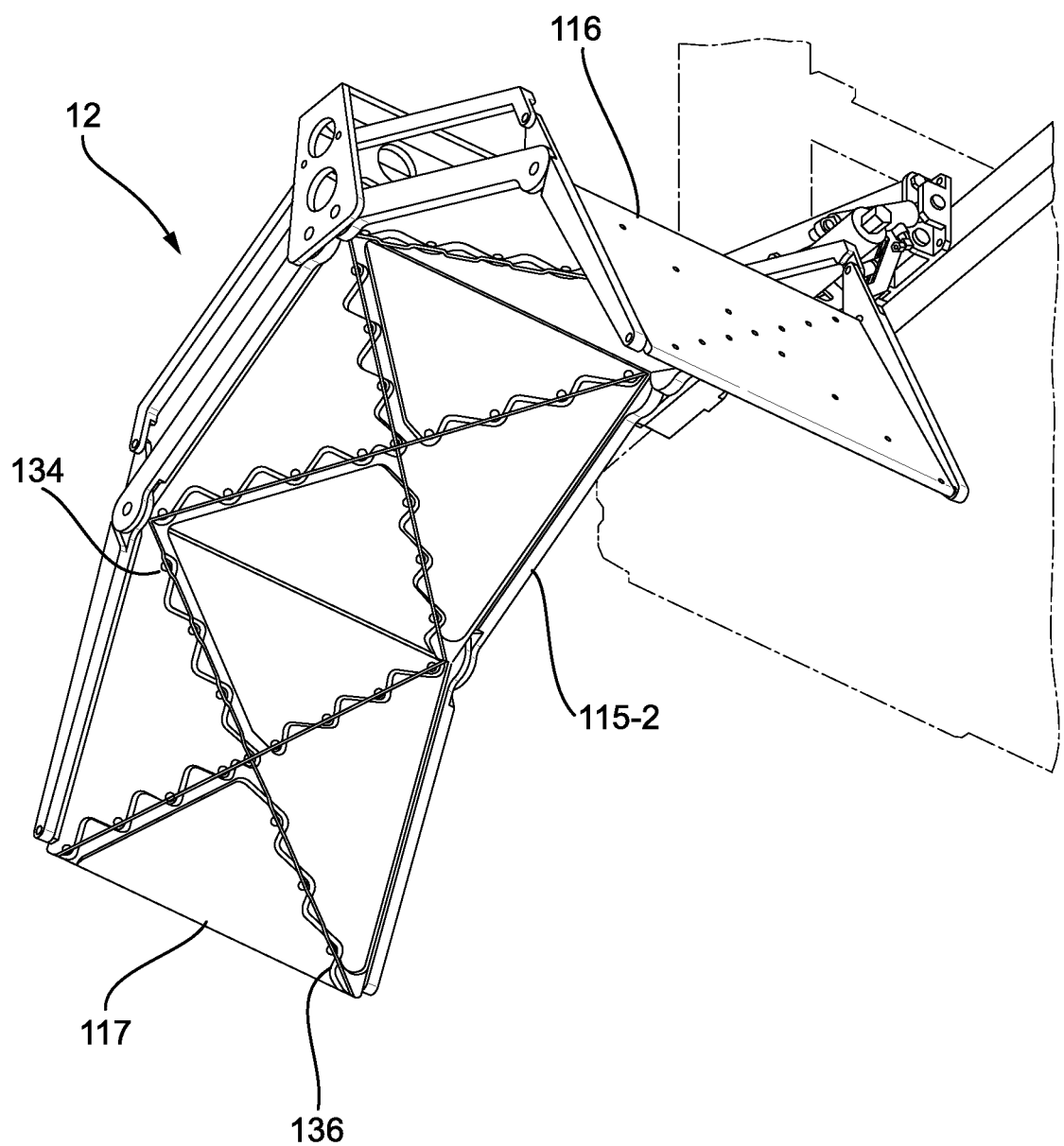
FIG. 8 is an illustration of the embodiment of FIGS. 6 and 7.

FIG. 8 illustrates the sensor arrangement 112 from below, while the panel structure is opened. The panels 115-1, 115-2, 116 and 117 comprise a plurality of small holes 134 distributed across the surfaces of the panels. In or near the holes, e.g. on the upper sides of the panels, the sensors 27 (provided by fiber Bragg gratings as described hereinbefore) are located. The zigzag pattern of flow guides 136 causes any bubbles or fluid pockets to be led towards the holes 134, where they are led past the sensors 27.

Figure 9:
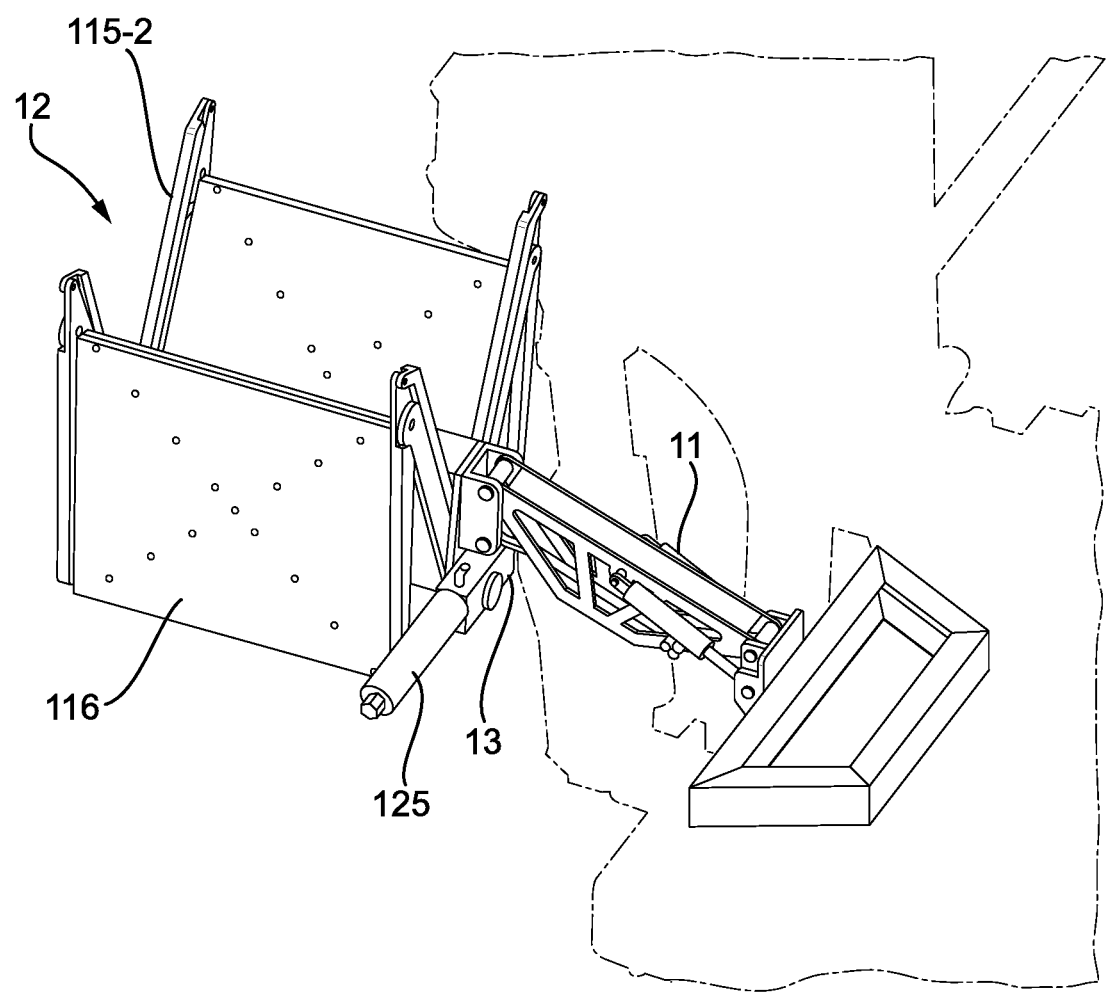
FIG. 9 is an illustration of the embodiment of FIGS. 6-8.

FIG. 9 illustrates that the design of the sensor arrangement of FIGS. 6-9 is foldable, in the sense that the panels 115-1, 115-2, 116 and 117 can be folded to form a compact stack of panels. Hence, the detection panels 115-1, 115-2, 116 and 117 are mounted to the foldable support structure 13. The foldable support structure 13 comprises actuator 125 for folding and unfolding the detection panels 115-1, 115-2, 116 and 117 relative to each other, such to assume different mutual angles. As may be appreciated, a different manner of folding may be likewise applied. The folding is achieved by operating the actuator 125 located on the support structure 13 of sensor arrangement 12. During deployment and retrieval of the sensor arrangement, it is more convenient to use a foldable design such as is illustrated in FIGS. 6-9. Additionally, folding the panels during deployment and retrieval also diminishes the risk of damage to the sensors 27 that may be caused by any accidental bumping of the panels against a crane or a hull of a ship. The skilled person will appreciate that the detection panels 115-1, 116 can also be moved (e.g. folding and/or unfolding) independently from the detection panels 115-2, 117 to accommodate irregular shaped objects. The main advantage of a foldable panel design as illustrated in FIGS. 6-9 is the fact that the panels may be folded differently dependent on the size or shape of the fluid carrying body (e.g. the pipeline 3). As may be appreciated, this allows to use the sensor arrangement 12 with various pipe diameters, enabling close approach of the panels 115-1, 115-2, 116 and 117 to the surfaces of the pipelines to be inspected.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A sensor arrangement for underwater detection of a leak in a fluid carrying body, the sensor arrangement comprising:
    a sensor support structure mounted to a carrier configured to enable the sensor support structure to be suitably positioned or moved relative to the fluid carrying body; and
    a sensor array comprising a plurality of thermal sensors distributed on the sensor support structure,
    wherein the plurality of thermal sensors are provided by one or more optical fibers connected to an interrogator via one or more optical signal connectors, each optical fiber of the one or more optical fibers having a plurality of intrinsic fiber optic sensors at respective locations within the optical fiber, the plurality of intrinsic fiber optic sensors forming the plurality of thermal sensors, the one or more optical fibers are arranged on the support structure such that the plurality of intrinsic fiber optic sensors are distributed across the support structure to span a detection area.

2. The sensor arrangement according to claim 1, wherein the plurality of intrinsic fiber optic sensors are arranged on the support structure to define a grid, wherein the intrinsic fiber optic sensors are regularly spaced.

3. The sensor arrangement according to claim 1, wherein at least one of:
    a spacing between two or more adjacent intrinsic fiber optic sensors of the plurality of intrinsic fiber optic sensors is within a range of 2 centimeter to 20 centimeter; or
    a spacing between two or more adjacent intrinsic fiber optic sensors of the plurality of intrinsic fiber optic sensors arranged on the support structure changes across the detection area; or
    a spacing between two or more adjacent intrinsic fiber optic sensors of the plurality of intrinsic fiber optic sensors is larger towards one or more sides of the detection area than in a middle section of the detection area; or
    a spacing between two or more adjacent intrinsic fiber optic sensors of the plurality of intrinsic fiber optic sensors arranged on the support structure changes across the detection area in accordance with a location dependent function which is dependent on a location of the respective sensors in the detection area.

4. The sensor arrangement according to claim 1, wherein the sensor support structure is shaped to provide, on at least one surface of the support structure, a detection area to be spanned by the plurality of intrinsic fiber optic sensors, the detection area comprising one or more planes or a curved surface.

5. The sensor arrangement according to claim 4, wherein at least one the surface of the support structure providing the detection area is shaped to enclose or curve around a detection space, or to face a detection point or line.

6. The sensor arrangement according to claim 4, wherein the at least one surface of the support structure comprises a main detection plane and one or more side detection planes,
    the one or more side detection planes are angled with respect to the main detection plane to face a pipe or tube to be scanned for leakage.

7. The sensor arrangement according to claim 1, wherein the plurality of intrinsic fiber optic sensors include at least one element of a group comprising: one or more fiber Bragg gratings; one or more ring resonators; one or more fiber lasers; and one or more multicore fiber sensors.

8. An underwater vehicle for the detection of a leak in a fluid carrying body, the vehicle comprising:
    a sensor arrangement comprising a sensor array, wherein the sensor array comprising a plurality of thermal sensors distributed on a sensor support structure; and
    a carrier to which the sensor support structure of a sensor arrangement is mounted for enabling the sensor support structure to be suitably positioned or moved relative to the fluid carrying body,
    wherein the plurality of thermal sensors are provided by one or more optical fibers connected to an interrogator via one or more optical signal connectors, each optical fiber of the one or more optical fibers comprising a plurality of intrinsic fiber optic sensors at respective locations within the optical fiber, the plurality of intrinsic fiber optic sensors forming the plurality of thermal sensors, the one or more optical fibers are arranged on the support structure such that the plurality of intrinsic fiber optic sensors are distributed across the support structure to span a detection area.

9. The underwater vehicle according to claim 8, further comprising:
an optical source and an optical receiver, wherein the optical source is configured to provide an optical signal to the one or more optical fibers of the sensor arrangement, and wherein the optical receiver is arranged for receiving an optical output signal from the one or more optical fibers; and
a controller device cooperating with the optical receiver for processing of the optical output signals.

10. The underwater vehicle according to claim 9, further comprising an interrogator configured to provide the optical receiver and the controller device.

11. The underwater vehicle according to claim 8, further comprising:
a positioning system;
an analyzer communicatively connected to a controller device and configured to receive a controller output signal and perform analysis for leak detection;
a memory unit for data storage; and
a communication device configured to exchange data with a remote system.

12. The underwater vehicle according to claim 8, further comprising:
an optical connector configured to provide at least one or both of an optical signal input and an optical signal output;
a clock configured to be synchronized with a remote clock via a optical fiber line;
an ultra short base line acoustic positioning system comprising a transponder; and
a controller device configured to associate a transponder signal provided by the transponder with a clock signal from the clock configured to associate an optical sensor signal with a location remotely at a survey carrier.

13. A method of performing underwater inspection for detection of a leak in a fluid carrying body, the method comprising:
applying a sensor arrangement having a sensor support structure mounted to a carrier, wherein a plurality of thermal sensors are distributed on the sensor support structure forming a sensor array;
moving the sensor support structure relative to the fluid carrying body,
obtaining sensor signals from the plurality of thermal sensors; and
detecting a difference in temperature, as indicated by at least one of the sensor signals relative to at least one further sensor signal, in at least one locality relative to an ambient temperature,
wherein the plurality of thermal sensors are provided by one or more optical fibers, each optical fiber comprising a plurality of intrinsic fiber optic sensors at respective locations within the optical fiber, the plurality of intrinsic fiber optic sensors forming the plurality of thermal sensors, wherein the one or more fibers are arranged on the support structure such that the plurality of intrinsic fiber optic sensors is distributed across the support structure such as to span a detection area.

14. The method according to claim 13, wherein the fluid carrying body is an underwater pipeline conveying oil, the oil having a temperature above an ambient temperature of the ambient water,
wherein the detecting further comprising:
detecting the temperature difference as a spike shaped or delta pulse shaped signal in a sensor signal of one thermal sensor of the plurality of thermal sensors or in sensor signals of two or more adjacent thermal sensors of the plurality of thermal sensors, the delta pulse shaped or spike shaped signal being indicative of an oil bubble of said oil in the ambient water.

15. The method according to claim 13, wherein the plurality of intrinsic fiber optic sensors are arranged on the support structure to define a grid, such that the intrinsic fiber optic sensors are regularly spaced, the method further comprising:
mapping of a local temperature profile from the sensor signals.

16. The method according to claim 13, further comprising:
providing, using an optical source, an optical input signal to the one or more fibers of the sensor arrangement, and
receiving, using and optical receiver, one or more optical output signals from the one or more optical fibers, for detecting the temperature difference from the one or more optical output signals.

* * * * *